Nov. 6, 1945.　　　A. ST. J. BOWIE　　　2,388,520
PLUNGER PACKING
Filed Nov. 28, 1942
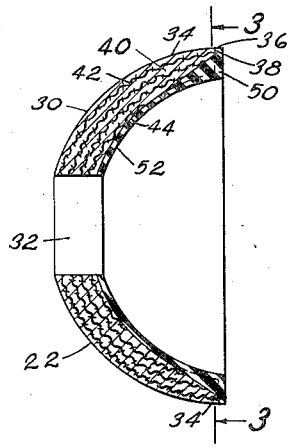
FIG_1　　FIG_2
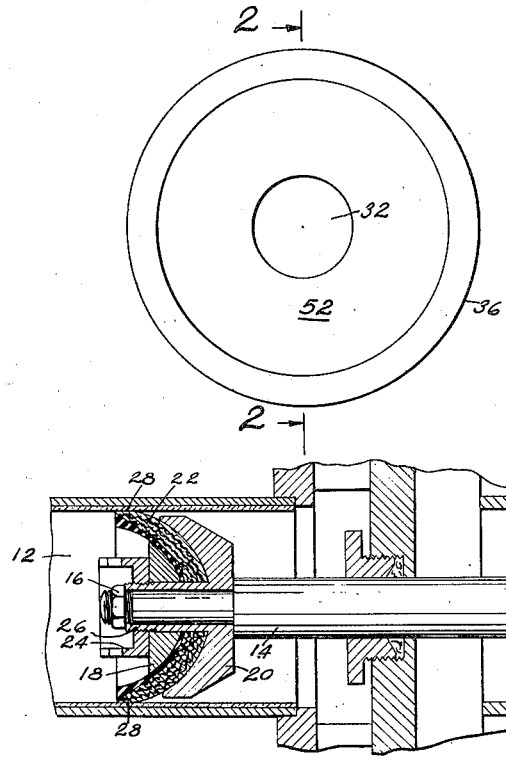
FIG_4
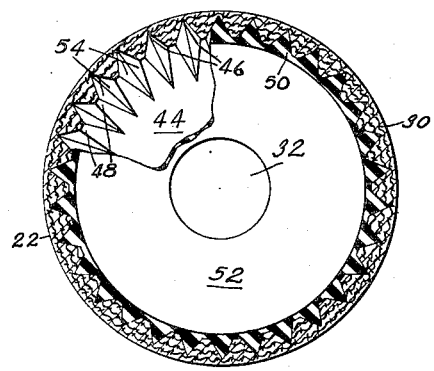
FIG_3
INVENTOR
ADRIAN ST. JOHN BOWIE
BY
Philip A. Minnis
ATTORNEY Patented Nov. 6, 1945

2,388,520

UNITED STATES PATENT OFFICE 2,388,520

PLUNGER PACKING

Adrian St. John Bowie, San Jose, Calif., assignor to Food Machinery Corporation, San Jose, Calif., a corporation of Delaware Application November 28, 1942, Serial No. 467,237

5 Claims. (Cl. 309—33)

This invention relates to packings and more particularly to cup packings for plunger pumps.

Cup packings are commonly required on reciprocating plungers for pumps for creating a fluid-tight connection between the piston and interior surface of the pump cylinder.

For the purpose of illustrating my invention I shall make reference to packings used on high pressure pumps handling or controlling spray fluids or solutions such as of oil, lead arsenic, lime sulphur and lime copper sulphate at pressures in the order of 300 to 600 lbs. per square inch. Packings for this use have heretofore been made by vulcanizing together layers of rubber and fabric or fibre such as duck formed into a cup shape body. The packing was necessarily rigid and stiff but had sufficient resiliency to allow its lip to be forced into the pump cylinder which normally was smaller in diameter than the packing, sometimes as much as $\frac{1}{16}$ of an inch.

One of the principal problems heretofore encountered with packings of this character has been their tendency to allow the fluid to break through the seal and by erosion and chemical action cause deterioration of the outer face of the packing especially the heel portion of its lip where it engages the cylinder wall. This condition materially reduced the useful life of the packing. The break down of the seal has been attributed to kinking of the inner surface of the body when the packing was forced into the cylinder, this deformation apparently transmitting a pull through the fibers tending to lift the leading edge of the packing lip and to produce an uneven pressure contact of the lip with respect to the cylinder wall. In operation of the pump the fluid pressure acting against the inner face of the packing further aggravated this lifting tendency.

I have now discovered that these difficulties may be minimized and an improved seal be obtained by notching the inner surface of the packing lip and that additional advantages may be obtained by filling the notches with a highly resilient material.

Accordingly it is the general object of my invention to provide an improved packing structure that has a greater useful life than prior packings.

It is also an object to provide a packing that will produce a more uniform and tighter fluid seal between the piston and cylinder of a pump.

Another object is to provide a packing having greater resistance to erosion and chemical attack.

Other objects and advantages of my invention will become more apparent from the following description taken in connection with the accompanying drawing wherein:

Fig. 1 is an end view of the packing of my invention;

Fig. 2 is a longitudinal section taken along the axis of the packing as indicated by the arrows 2—2 in Fig. 1;

Fig. 3 is a transverse section taken as indicated by the arrows 3—3 in Fig. 2, parts being broken away to show the notching; and Fig. 4 is a section through a high pressure pump cylinder showing a plunger provided with the packing of my invention.

Referring to the drawing in which similar numerals refer to similar parts throughout the several views, 10 represents a portion of a fluid pump having a cylinder 12 and a plunger 14 reciprocable therein. Seated on the plunger and held thereto by a nut 16 is a packing assembly consisting of a pair of collars 18 and 20 respectively, between which the cup packing 22 of my invention is clamped by means of a nut 24 threaded over the shank 26 of the collar 20. It will be observed that the packing 22 engages the wall of the cylinder 12 as at 28 to create a fluid seal therewith.

The packing 22 comprises a cup shaped body 30, of substantially circular transverse section having a circular opening 32 for receiving the shank 26 of the collar 20 of the pump plunger, and having an outwardly extending resilient peripheral lip portion 34, for engaging the cylinder wall of the pump. The body is preferably semi-spheroidal in shape and its wall is preferably of greatest thickness at the bottom of the cup and tapers down in thickness to the outer end or rim 36 of the lip portion which terminates in the face 38.

As shown in Fig. 2 the body of the cup is preferably composed of rubber or the like 40 and superposed laminae 42 of fabric or fiber such as duck, customarily alternate layers of rubber and fabric, pressed into the cup shape and vulcanized or otherwise made into a relatively rigid and stiff composite nevertheless having sufficient resiliency in its lip portion 34 to enable the cup to be forced into the cylinder of a pump smaller in diameter than itself to form a fluid seal with the wall thereof, and also to respond to the fluid pressure in operation of the pump to increase the effectiveness of the seal.

Arranged around the inner spherical surface 44 of the body adjacent the rim 36 of the peripheral lip portion, as seen in Fig. 3 I provide a series of preferably equally spaced narrow longitudinal grooves, notches, furrows or depressions 46 extending into the cup body but not through the same; that is, they bottom in the body. Each depression also preferably begins at the rim 36 and extends inwardly toward the bottom of the cup along an axis radiating from a point on the longitudinal axis of the cup and terminates inwardly of the opening 32. Each depression has its greatest depth and width at the edge face 38, and gradually reduces in such dimensions until the depression runs out at the face 44 as shown. The adjacent depressions are separated by raised ridges or ribs 48 substantially equal in width and depth to the depressions 46, and complementary in shape. The bottom portions of the depressions therefore form web sections connecting the adjacent ribs. The depth of the depressions should be sufficient to make these webs flexible. In actual practice I have found that depressions of about ¼ of an inch spacing and having a depth leaving a web 1/16" thick at the face 38 provide good results with a 2¼" packing.

It is preferred that the depressions 46 be of a generally V section. However, it will be understood that depressions and ribs of other shapes, for instance rectangular or semi-circular may be used. It will be likewise understood that the depressions may be formed in the body of the cup by cutting out the necessary portions or by ruffling the fabric or fiber laminae of the body in molding the cup to create corrugations forming depressions.

By reason of the described depressions it becomes possible to force the packing of my invention into a pump cylinder without causing kinking of the inner face 44 of the cup body which deformation and distortion of the cylinder contacting portion would normally take place were the depressions 46 not present. The ribs 48 merely close in to compensate for the reduction in diameter of the cup and the depressions 46 allow for this change in shape of the surface 44 without actual deformation taking place. Consequently the cup forms a definite seal with the pump cylinder with a minimum of distortion to its cylinder contacting portion and does not lift at its leading edge 36.

A further important feature of my invention consists in inserting a layer, or better yet filling in the depressions 46 preferably at least flush with the faces 38 and 44 of the cup body with a highly elastic material 50, such as soft rubber or the like which may be vulcanized or otherwise bonded to the cup body 30 to form an integral structure therewith. Preferably the inserted material will be integrally connected by a skin layer 52 of similar material to cover the entire faces 38 and 44 with such material.

The inserted material provides additional advantages. It seals the face of the packing that acts upon the fluid and thereby protects the cup body especially the fibers thereof from chemical attack especially where the depressions are cut out of the cup body. It also protects the body of the packing from the abrasion of gritty fluids. When the cup is forced into a pump cylinder the soft elastic filler 50 allows the ribs 48 to close in without deforming the face 44 of the cup body, the inserts merely compressing and bulging inwardly of the cup in response to the pressure applied thereto by the ribs 48. However the compressed material exerts a counterpressure against the faces 54 of the ribs 48 with the result that a very uniform pressure contact is obtained by the lip 34 of the cup body with the cylinder wall.

Moreover, in operation of the pump the inserted material tends to flow under the pressure of the fluid causing the lip portion of the cup to try to enlarge and press still harder against the encircling cylinder wall to produce a more definite seal therewith.

While the particular packing structure herein described is well adapted for carrying out the objects of the present invention it will be understood that various modifications, changes and substitutions may be made without departing from the spirit thereof and the present invention is to be construed to include all such modifications, changes and substitutions as may come within the scope of the following claims.

What I claim as new and desire to protect by Letters Patent is:

1. A pump packing comprising a semi-spheroidal cup shaped body of relatively stiff material and of substantially circular transverse section, having a resilient peripheral lip portion for contacting the wall of a cylinder, said lip portion having in its inner surface adjacent its rim a series of grooves beginning tangentially with respect to said inner surface to terminate adjacent the rim of said lip portion at sufficient depth to leave flexible web portions at the outer surface of said lip, whereby to permit the packing to be forced into a cylinder of less diameter than itself with a minimum of distortion to its lip portion.

2. A pump packing comprising a cup shaped body of relatively stiff material and of substantially circular transverse section, having a resilient peripheral lip portion for contacting the wall of a cylinder, said lip portion having in its inner surface adjacent its rim a series of grooves bottomed in said lip portion whereby to permit the body to be contracted under pressure into a cylinder of less diameter than itself with a minimum of distortion to its cylinder contacting portion, and a soft elastic material such as rubber, integral with said body and filling said grooves, said material being more resilient than said lip portion whereby to permit said material to yield in response to said contraction but directing pressure against said lip portion to substantially uniformly seal said lip portion against the wall of the cylinder.

3. A pump packing comprising a cup shaped body of relatively stiff material and of substantially circular transverse section, having a resilient peripheral lip portion for contacting the wall of a cylinder, the wall of said body tapering in thickness from the bottom of said cup to the rim of said lip portion, and said wall having a series of grooves in its inner surface beginning at said rim and extending toward said bottom whereby to permit the body to be contracted under pressure into a cylinder of less diameter than itself with a minimum of distortion to its cylinder contacting portion, and a soft elastic material such as rubber integral with said body, covering said inner surface and rim and filling said grooves, said material being more resilient than said lip portion whereby to permit said material to yield in response to said contraction but directing pressure against said lip portion to substantially uniformly seal said lip portion against the wall of the cylinder.

4. A pump packing comprising a cup shaped body of relatively stiff material and of substantially circular transverse section, having a resilient peripheral lip portion at its rim for contacting the wall of a cylinder, said body also having in its inner surface a series of grooves beginning intermediate the bottom and rim of the cup and increasing in depth and terminating at said rim at a depth to leave flexible webs at the outer surface of said lip portion, whereby to permit the packing to be forced into a cylinder of less diameter than itself with a minimum of distortion to its lip portion.

5. A pump packing comprising a cup shaped body of relatively stiff material and of substantially circular transverse section, having a resilient peripheral lip portion at its rim for contacting the wall of a cylinder, said body having in its inner surface a series of grooves beginning intermediate the bottom and rim of the cup and increasing in depth and terminating at said rim at a depth to leave flexible webs at the outer surface of said lip, whereby to permit the packing to be contracted into a cylinder of less diameter than itself with a minimum of distortion to its lip portion, and a coating of soft elastic material such as rubber integrally connected to the rim and inner surface of said cup and grooves for sealing the same against the action of fluid under pressure thereon, said material being more resilient than the lip portion to permit yielding thereof when said packing is contracted and to direct pressure against said lip portion to substantially uniformly seal the same against the wall of the cylinder.

ADRIAN ST. JOHN BOWIE.